US006196727B1

United States Patent
Kawamura

(10) Patent No.: US 6,196,727 B1
(45) Date of Patent: Mar. 6, 2001

(54) ROLLING BEARING UNIT WITH TRACK SURFACE FOR ENSURING PROPER POSITIONING OF LIP SEAL DURING ASSEMBLY

(75) Inventor: Motoshi Kawamura, Nara-ken (JP)

(73) Assignee: Koyo Seiko Co., LTD (JP)

( * ) Notice: Under 35 U.S.C. 154(b), the term of this patent shall be extended for 0 days.

(21) Appl. No.: 09/235,669

(22) Filed: Jan. 22, 1999

(30) Foreign Application Priority Data

Jan. 27, 1998 (JP) .................................................. 10-029166

(51) Int. Cl.$^7$ ...................................................... B60B 27/02
(52) U.S. Cl. ........................ 384/544; 384/586; 384/513; 301/105.1
(58) Field of Search ................................... 384/544, 537, 384/584, 586, 513, 516, 486; 301/105.1

(56) References Cited

U.S. PATENT DOCUMENTS

| | | | |
|---|---|---|---|
| 4,786,115 | * 11/1988 | Ashberg | 384/544 X |
| 4,887,917 | * 12/1989 | Troster et al. | 301/105.1 X |
| 4,958,944 | * 9/1990 | Hofmann et al. | 384/537 X |
| 5,011,233 | 4/1991 | Nomura et al. | 301/108.1 |
| 5,209,701 | * 5/1993 | Ishikawa et al. | 301/105.1 X |
| 5,226,737 | * 7/1993 | Sandy, Jr. | 384/513 X |
| 5,803,617 | * 9/1998 | Ohnuki et al. | 384/544 X |
| 5,975,765 | * 11/1999 | Kawamura | 384/537 |
| 6,022,275 | * 2/2000 | Bertetti | 301/105.1 X |

FOREIGN PATENT DOCUMENTS

| | | | |
|---|---|---|---|
| 3421188 | * 12/1985 | (DE) | 301/105.1 |
| 065127 | * 11/1982 | (EP) | 301/105.1 |

* cited by examiner

Primary Examiner—Charles A Marmor
Assistant Examiner—Ankur Parekh
(74) Attorney, Agent, or Firm—Adams & Wilks

(57) ABSTRACT

A rolling bearing unit comprises a first inner ring member having a first outer peripheral surface portion, a second outer peripheral surface portion, a peripheral shoulder formed in the first outer peripheral surface portion, a track surface formed in the second outer peripheral surface portion, a convex portion formed in the second outer peripheral surface portion adjacent an outer axial end of the track surface, and a shaft portion. A second inner ring member is connected to an end of the shaft portion of the first inner ring member and has a track surface formed in an outer peripheral surface thereof. An outer ring member has a first track surface and a second track surface formed in its inner peripheral surface. A first rolling member is disposed between the track surface of the first inner ring member and the first track surface of the outer ring member. The convex portion of the second outer peripheral surface portion has a flat surface on which the first rolling member rolls during assembly of the rolling bearing unit. A second rolling member is disposed between the track surface of the second inner ring member and the second track surface of the outer ring member. A seal member is connected to the outer ring member and has a lip for sliding contact with the peripheral shoulder of the first inner ring member.

9 Claims, 4 Drawing Sheets

ROLLING BEARING UNIT WITH TRACK SURFACE FOR ENSURING PROPER POSITIONING OF LIP SEAL DURING ASSEMBLY

FIELD OF THE INVENTION

The present invention relates to a rolling bearing unit used for automobiles, and more specifically, to a rolling bearing unit in which a sub-assembly article including an outer ring member, a rolling member, a retainer and a seal is incorporated into a shaft portion of an inner ring member when assembled not limiting to automobiles.

BACKGROUND OF THE INVENTION

An example of a rolling bearing unit used for an automobile or the like and heretofore known is shown in FIGS. 3 and 5, for example, as in U.S. Pat. No. 5,011,233. Referring to FIG. 3, reference numeral 30 designates a first inner ring member, 36 a second inner ring member, 38 a nut for pressing and fixing the second inner ring member 36, and 40 an outer ring member. The first inner ring member 30 has, so that a seal 45 secured to an inner end 40a of the outer ring member 40 may be slidably moved, a peripheral shoulder 34 formed in an axial outer surface 33b of a root portion 33a of a radial flange 33 for fixing a wheel provided in an outer peripheral surface of an inner end 31 thereof, and a track surface 35 formed in a peripheral surface of a shaft portion 30a smaller in diameter than that of the peripheral shoulder 34. The second inner ring member 36 is fitted in a step portion 48 formed in the end of the shaft portion 30a of the first inner ring member 30 and has a track surface 37 formed in an outer surface. The outer ring member 40 has a radial flange 39 for fixing a vehicle provided in an outer peripheral surface thereof and track surfaces 42 and 41 provided opposite to and in inner peripheral surfaces of both the track surfaces 35 and 37 of the first and second inner ring members 30 and 36, respectively. Rolling members 43 and 44 are respectively arranged between the track surfaces 35 and 42 provided opposite to each other in the first inner ring member 30 and the outer ring member 40, respectively, and between the track surfaces 37 and 41 provided opposite to each other in the second inner ring member 36 and the outer ring member 40. Further, a lip 46 of a seal 45 secured to an inner end 40a of the outer ring member 40 to prevent a leakage of a lubricant such as grease, and prevent an entry of foreign matter such as dust and water into the bearing comprises a main lip 46a directed externally of the bearing and sliding on the peripheral shoulder 34, an auxiliary lip 46b directed internally of the bearing and sliding on the peripheral shoulder 34, and a side lip 46c sliding on the axial outer surface 33b of the radial flange 33 for fixing a wheel. The bearing unit has a cover 47 secured to the outer end 40b of the outer ring member 40 for covering the shaft end, and a retainer 48a for retaining the rolling members 43 and 44. As will be apparent from the drawing, in the rolling bearing unit, a diameter D of the shaft portion 30a of the first inner ring member 30 is formed to have a smaller diameter than a bottom diameter D1 of the track surface 35. This is because of consideration that in assembly of the rolling bearing unit of this kind, when the sub-assembly including the outer ring member 40, the rolling members 43 and 44, the retainer 48a and the seal 45 is incorporated into the rolling bearing unit, the rolling members 43 and 44 are moved to the peripheral shoulder 34 and the seal 45 is installed in an adequate position.

In the case where the diameter of the shaft portion 30a of the first inner ring member 30 is formed to be smaller than the bottom diameter D1 of the track surface 35 in consideration of the assembling property of the aforementioned rolling members, the rolling member 44 causes a diametral clearance between the shaft portion 30a and the outer ring member 40 to be large when the rolling member is not run on the track surface 35 before the sub-assembly is incorporated into the shaft portion of the first inner ring completely, as will be understood from FIG. 5. Therefore, when the sub-assembly is further incorporated into the shaft portion so that the rolling members 43 and 44 are run on and installed on the track surfaces 37, 35, respectively the outer ring member sometimes greatly deviates in a diametral direction. The main lip 46a of the seal 45 is formed externally of the bearing as described above in consideration of preventing an entry of grease, contaminated water and the like from the outside of the bearing. As a result, when the main lip 46a of the seal 45 is incorporated as the sub-assembly article into the rolling bearing unit 30a during assembly, it is sometimes caught in a corner 34a (FIG. 3) of the peripheral shoulder 34 of the first inner ring member 30 so that the main lip 46a is bent backward in the direction opposite to the rolling member and installed in the peripheral shoulder 34, posing a problem in that sealing properties between the first inner ring member 30 and the outer ring member 40 fail to be maintained.

As a means for preventing the phenomenon as described above, a rolling bearing unit as shown in FIG. 4 is proposed. In this rolling bearing unit, a slanting surface 49 serving as a guide portion for the main lip 46a is formed between the peripheral shoulder 34 of the first inner ring member 30 and the track surface 35. When the slanting surface 49 is formed between the peripheral shoulder 34 of the first inner ring member 30 and the track surface 35 as described above, it needs to be designed in a manner of that in the length of the whole rolling bearing unit, a portion of the length required for the slanting surface is extended in an axial direction. As a result, there poses a problem that the weight of the whole rolling unit increases.

SUMMARY OF THE INVENTION

It is an object of the present invention to provide a rolling bearing unit in which in an assembly operation of the rolling bearing unit, when a sub-assembly including an outer ring member, a rolling member, a retainer and a seal is incorporated into the rolling bearing unit, a main lip of the seal can be prevented from being bent backward, and the dimension of the whole unit need not to be larger.

For solving the aforementioned problem, the present invention provides a bearing unit including a peripheral shoulder formed as a sliding portion of a seal in a root portion of a radial flange provided in an outer peripheral surface of an inner end; a first inner ring member having a track surface formed in a peripheral surface of a shaft portion and having a smaller diameter than that of the peripheral shoulder; a second inner ring member fitted in an end of a shaft portion of the first inner ring member and having a track surface formed in an outer peripheral surface; a fixing member for pressing and fixing the second inner ring member; an outer ring member having a flange provided in an outer peripheral surface and track surfaces respectively formed in an inner peripheral surface opposite to both the track surfaces of the first and second inner ring members; rolling members respectively arranged between both the track surfaces of the first inner ring member and the outer ring member opposite to each other and between both the track surfaces of the second inner ring member and the outer ring member opposite to each other; and a seal pressed in and secured to an inner end of the outer ring member and having a lip sliding on the peripheral shoulder, wherein the bearing unit has a convex portion having a larger diameter than a bottom diameter of the track surface and provided at an axial outer adjacent portion of the track surface of the first inner ring member, the convex portion being capable of stranding thereon and passing therethrough the rolling member when the rolling member is incorporated into the track surface.

DETAILED DESCRIPTION OF THE PREFERRED EMBODIMENT

Figure 1:
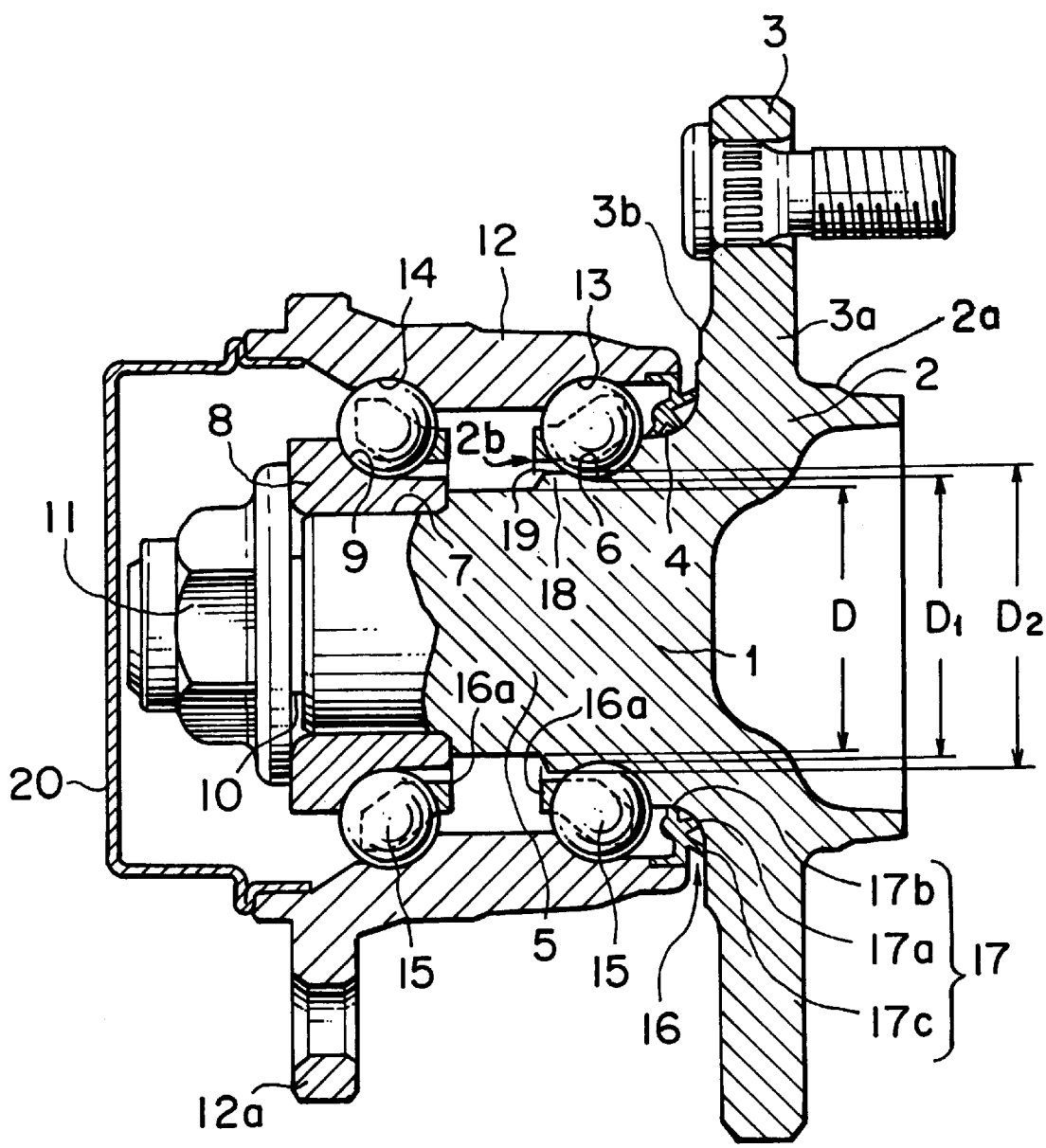
FIG. 1 is a sectional view showing one embodiment of the present invention.

A specific embodiment according to the present invention will be explained with reference to the drawings. Referring to FIG. 1 showing one embodiment according to the present invention, this rolling bearing unit includes a first inner ring member 1 having a peripheral shoulder 4 formed in an axial outer surface 3b of a root portion 3a of a radial flange 3 for fixing a wheel provided in an outer peripheral surface of an inner end 2. The radial flange is disposed on a first outer peripheral surface portion 2a of the inner end 2. A track surface 6 is formed in a second outer peripheral surface portion 2b of the inner end 2 with continuous extension to said peripheral shoulder 4 and has a smaller diameter than that of the peripheral shoulder. A second inner ring member 8 is fitted in a peripheral step 7 formed on the end side of a shaft portion 5 of the first inner ring member 1 and has a track surface 9 in an outer peripheral surface. The rolling bearing unit further includes a connecting member, such as a nut 11, engaged with a screw portion 10 formed in the end of the shaft portion 5 of said first inner ring member 1 for pressing and fixing the second inner ring member 8, an outer ring member 12 having a radial flange 12a for fixing a vehicle body provided in an outer peripheral surface thereof and track surfaces 13 and 14 respectively formed in the inner peripheral surface opposite to the track surfaces 6 and 9 of the first and second inner ring members 1 and 8, rolling members 15 respectively arranged between both the track surfaces 6 and 13 of the first inner ring member 1 and the outer ring member 12 opposite to each other and between both the track surfaces 9 and 14 of the second inner ring member 8 and the outer ring member 12 opposite to each other, a retainer 16a for retaining the rolling member 15, and a seal 16 formed from an elastic member such as nitrile rubber and having a lip 17 secured to the inner end of the outer ring member 12 and sliding on the peripheral shoulder 4.

The lip 17 of the seal 16 comprises a main lip 17a directed externally of the bearing and sliding on the peripheral shoulder 4, an auxiliary lip 17b directed internally of the bearing and sliding on the peripheral shoulder 4, and a side lip 17c sliding on the axial outer surface 3b of the radial flange 3 for fixing a wheel.

Further, in the rolling bearing unit according to the present invention, a convex portion 18 having a larger diameter D2 than the track surface 6 is formed adjacent an axially outer end of the track surface 6 of the first inner ring member 1, and a flat surface 19 extending on the axis is formed in the top of the convex portion 18. A diameter of the track surface 6 corresponding to the conventional track surface of the inner ring member 1 forms a bottom diameter D1 with respect to a diameter D2 of the convex portion 18, the bottom diameter D1 being larger than a diameter D of the shaft portion 5. That is, the bottom diameter D1 of the track surface 6 is larger than the diameter D of the shaft portion 5, but smaller than the diameter D2 of the convex portion 18, the relationship between these three diameters established being D2>D1>D. The diameter D of the shaft portion 5, the bottom diameter D1 of the track surface 6 of the first inner ring member 1, and the diameter D2 of the convex portion 18 are preferably, in the specific numerical value, D=36 mm, D1=36.226 mm, and D2=36.35 mm, respectively. A reference of the numerical value of the diameter D of the convex portion 18 is the diametrically central part of the shaft portion, and its numerical value can be changed by the diametrically central part of the shaft portion and the numerical value of the diameter. Accordingly, the specific numerical values have been mentioned, but the numerical values of D, D1 and D2 can be freely changed according to the diameter of the shaft portion of the rolling bearing unit and the use thereof.

Figure 2:
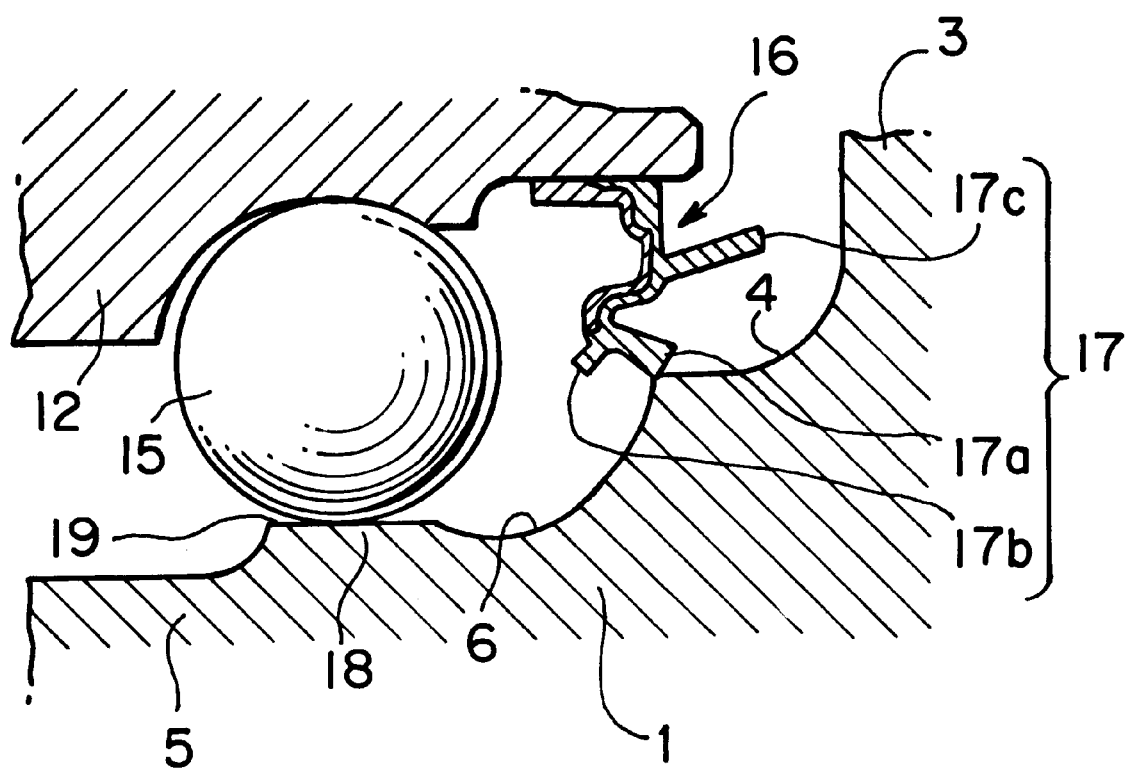
FIG. 2 is a sectional view showing a bearing incorporating state according to the present invention.
Figure 3:
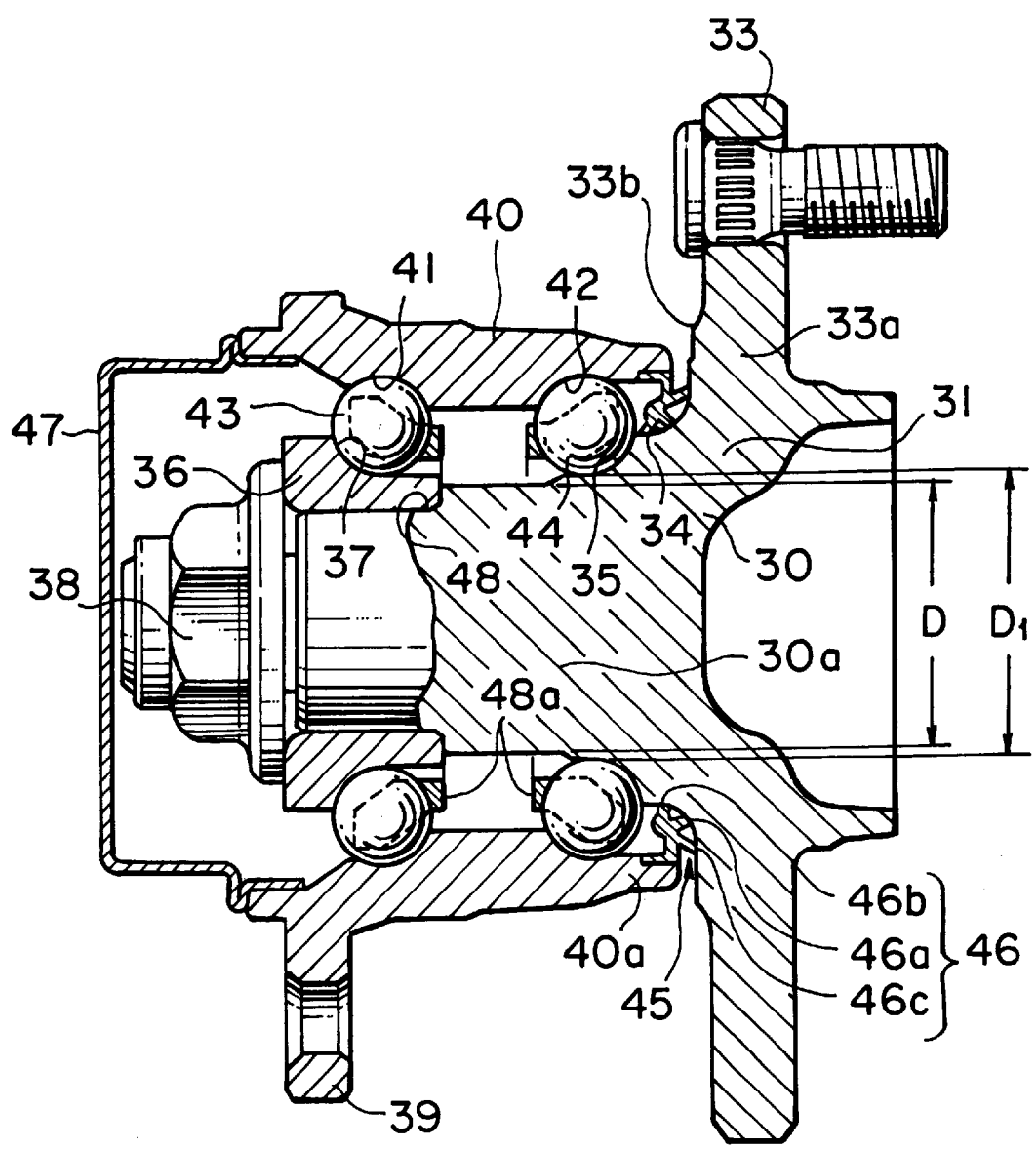
FIG. 3 is a sectional view of a conventional rolling bearing unit.
Figure 4:
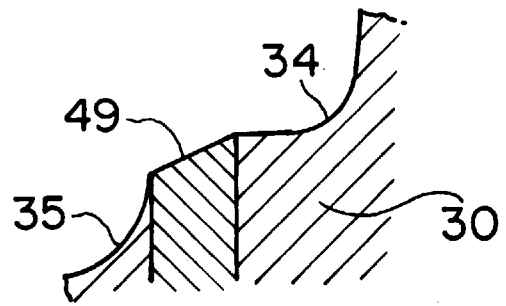
FIG. 4 is a sectional view of a part of a first inner ring member of a further conventional rolling bearing unit.
Figure 5:
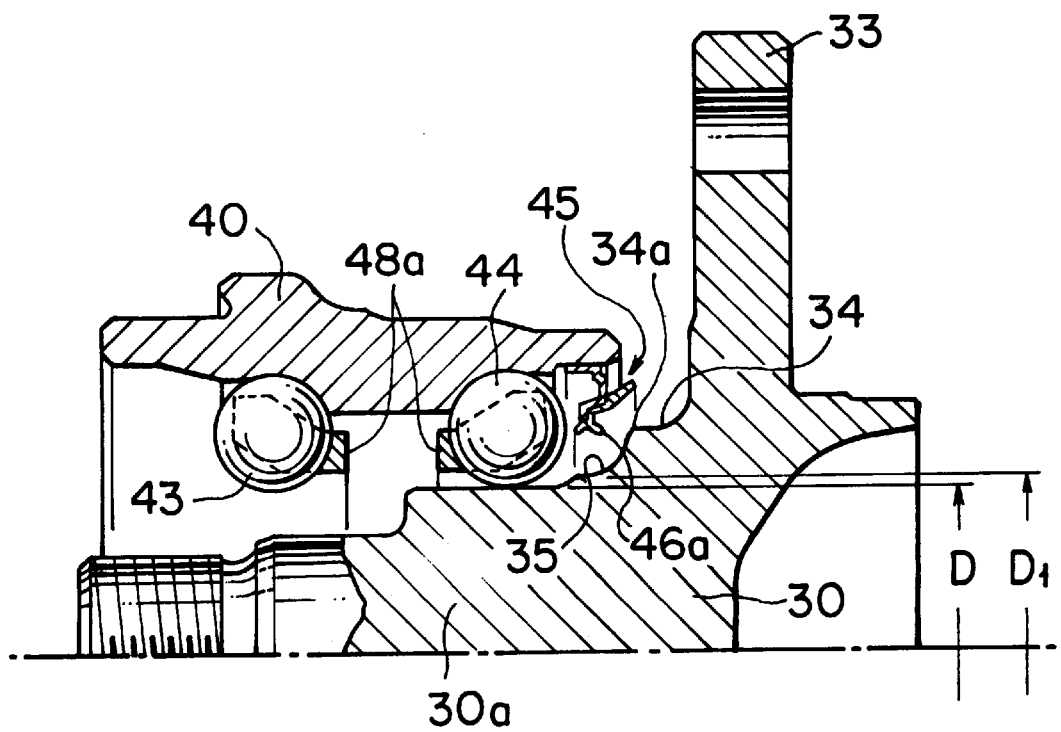
FIG. 5 is a sectional view showing an assembly operation of the conventional rolling bearing unit shown in FIG. 3.

During an assembly operation of the rolling bearing unit according to the present invention, when the sub-assembly including an outer ring member, a rolling member, a retainer and a seal is incorporated into the rolling bearing unit, the rolling member 15 runs on the flat surface 19 of the convex portion 18 adjacent the track surface 6. The diameter of the rolling member 15 is designed so as to be equal to the length between the flat surface 19 and the track surface 13 when the rolling member is positioned between the flat surface 19 of the convex portion 18 to be the diameter D2 and the track surface 13 of the outer ring member 12. Accordingly, when the sub-assembly is further incorporated into the rolling bearing unit, the rolling member smoothly rolls on the flat surface 19 of the convex portion 18 and is installed in the track surface 6 forming the bottom diameter D1. That is, since the rolling member 15 runs on the convex portion 18 and is installed in the bottom diameter D1, occurrence of a large diametral deviation of the outer ring member is overcome, and the main lip 17a of the seal 17 is also incorporated without being caught by a corner of the peripheral shoulder 4 of the first inner ring member 1. Further, when the rolling member 15 runs on the flat surface 19 of the convex portion 18, the contact surfaces of the outer ring member 12 and the rolling member 15 generate a deviation temporarily, as shown in FIG. 2, but if the rolling member 15 is installed in the track surface 6, a deviation of the contact surfaces of the outer ring member 12 and the rolling member 15 disappears, both of which are adequately fitted and incorporated. That is, in assembly operation of the rolling bearing unit according to the present invention, when the sub-assembly including an outer ring member, a rolling member, a retainer and a seal is incorporated into the rolling bearing unit, the resistant force applied to the entire unit generated when the main lip is caught by the corner of the peripheral shoulder almost disappears, and the main lip is not bent backward in the direction opposite to the rolling member when the former is installed in a position of the peripheral shoulder. Accordingly, the main lip 17a can adequately seal the shaft portion 5 of the rolling bearing unit.

In an assembly operation, in the rolling bearing unit in which the sub-assembly including an outer ring member, a rolling member, a retainer and a seal is incorporated thereinto, a cover 20 for covering the end of the shaft portion 5 is then incorporated. As described above, it is possible to obtain a rolling bearing unit having high sealing properties.

Further, since when in assembly operation, the sub-assembly including an outer ring member, a rolling member, a retainer and a seal is incorporated into the rolling bearing unit, the main lip 17a of the seal 17 is not caught by the corner of the peripheral shoulder 4 of the inner ring member 1, it is not even necessary to form a slanting surface between the track surface 6 and the peripheral shoulder 4 as a guide portion for the main lip 17.

As described above, in the rolling bearing unit according to the present invention, the convex portion having a larger diameter than the track surface is formed adjacent to the track surface. Therefore, in the assembly operation of the rolling bearing unit of the inner ring member, when the sub-assembly including an outer ring member, a rolling member, a retainer and a seal is incorporated into the rolling bearing unit, the shaft portion is not greatly deviated from the diametrically central part of the main lip but the lip is incorporated, the bend back of the lip can be prevented, and sealing can be attained.

Furthermore, in the rolling bearing unit according to the present invention, since it is not necessary to form a slanting surface for guiding the main lip of the seal between the track surface and the peripheral shoulder, its entirety will not be a larger shape than that which extends parallel with the shaft, and its weight will not increase.

What is claimed is:

1. A rolling bearing unit comprising:
   a first inner ring member having an inner axial end, a radial flange disposed on a first outer peripheral surface portion of the inner axial end, a peripheral shoulder formed in a root portion of the radial flange, a track surface formed in a second outer peripheral surface portion of the inner axial end and having a bottom diameter smaller than the smallest diameter of the peripheral shoulder, and a shaft portion having a diameter smaller than the bottom diameter of the track surface;
   a second inner ring member disposed on an end of the shaft portion of the first inner ring member and having a track surface formed in an outer peripheral surface thereof;
   a connecting member for connecting the second inner ring member to the shaft portion of the first inner ring member;
   an outer ring member having a radial flange disposed on an outer peripheral surface portion thereof, and track surfaces respectively formed in the inner peripheral surface thereof and opposite to the track surfaces of the first and second inner ring members;
   a first rolling member disposed between the track surface of the first inner ring member and the track surface of the outer ring member opposite to the track surface of the first inner ring member;
   a second rolling member disposed between the track surface of the second inner ring member and the track surface of the outer ring member opposite to the track surface of the second inner ring member;
   a plurality of retainers each for respectively retaining the first and second rolling members; and
   a seal connected to the inner axial end of the outer ring member and having a lip for sliding contact with the peripheral shoulder of the first inner ring member;
   wherein the second outer peripheral surface portion includes a convex portion located adjacent to the axial outer end of the track surface of the first inner ring member for receiving thereupon the first rolling member during assembly of the rolling bearing unit, the convex portion having a diameter greater than the bottom diameter of the track surface of the first inner ring member.

2. A rolling bearing unit according to claim 1; wherein the convex portion has a flat surface on which the first rolling member rolls during assembly of the rolling bearing unit; and wherein a distance between a flat surface of the convex portion and the track surface of the outer ring member opposite the track surface of the first inner ring member is equal to a diameter of the first rolling member when the first rolling member rolls on the flat surface of the convex portion during assembly of the rolling bearing unit.

3. A rolling bearing unit comprising:
   a first inner ring member having an inner axial end, a radial flange disposed on a first outer peripheral surface portion of the inner axial end, a peripheral shoulder formed in a root portion of the radial flange, a track surface formed in a second outer peripheral surface portion of the inner axial end and having a bottom diameter smaller than the smallest diameter of the peripheral shoulder, and a shaft portion having a diameter smaller than the bottom diameter of the track surface;
   a second inner ring member disposed on an end of the shaft portion of the first inner ring member and having a track surface formed in an outer peripheral surface thereof;
   a connecting member for connecting the second inner ring member to the shaft portion of the first inner ring member;
   an outer ring member having a radial flange disposed on an outer peripheral surface portion thereof, and track surfaces respectively formed in the inner peripheral surface of the outer ring member and opposite to the track surfaces of the first and second inner ring members;
   a first rolling member disposed between the track surface of the first inner ring member and the track surface of the outer ring member opposite to the track surface of the first inner ring member;
   a second rolling member disposed between the track surface of the second inner ring member and the track surface of the outer ring member opposite to the track surface of the second inner ring member;
   a plurality of retainers each for respectively retaining the first and second rolling members; and
   a seal connected to the inner axial end of the outer ring member and having a lip for sliding contact with the peripheral shoulder of the first inner ring member;
   wherein the second outer peripheral surface portion includes a convex portion adjacent the outer axial end of the track surface of the first inner ring member, the convex portion having a flat surface on which the first rolling member rolls during assembly of the rolling bearing unit, a distance between the flat surface of the convex portion and the track surface of the outer ring member opposite the track surface of the first inner ring member being equal to a diameter of the first rolling member when the first rolling member rolls on the flat surface of the convex portion during assembly of the rolling bearing unit.

4. A rolling bearing unit comprising:

a first inner ring member having a first outer peripheral surface portion, a second outer peripheral surface portion, a peripheral shoulder formed in the first outer peripheral surface portion, a track surface formed in the second outer peripheral surface portion, a convex portion formed in the second outer peripheral surface portion adjacent an outer axial end of the track surface, and a shaft portion;

a second inner ring member connected to an end of the shaft portion of the first inner ring member and having a track surface formed in an outer peripheral surface thereof;

an outer ring member having a first track surface and a second track surface formed in its inner peripheral surface;

a first rolling member disposed between the track surface of the first inner ring member and the first track surface of the outer ring member, the convex portion of the second outer peripheral surface portion having a flat surface on which the first rolling member rolls during assembly of the rolling bearing unit; a second rolling member disposed between the track surface of the second inner ring member and the second track surface of the outer ring member; and a seal member connected to the outer ring member and having a lip for sliding contact with the peripheral shoulder of the first inner ring member.

5. A rolling bearing unit according to claim 4; wherein the track surface of the first inner ring member has a bottom diameter smaller than a diameter of the peripheral shoulder of the first inner ring member.

6. A rolling bearing unit according to claim 5; wherein the shaft portion of the first inner ring member has a diameter smaller than the bottom diameter of the track surface of the first inner ring member.

7. A rolling bearing unit according to claim 6; wherein the convex portion adjacent the track surface of the first inner ring member has a diameter greater than the bottom diameter of the track surface of the first inner ring member.

8. A rolling bearing unit according to claim 7; wherein a distance between the flat surface of the convex portion and the first track surface of the outer ring member is equal to a diameter of the first rolling member when the first rolling member rolls on the flat surface of the convex portion during assembly of the rolling bearing unit.

9. A rolling bearing unit according to claim 4; wherein a distance between the flat surface of the convex portion and the first track surface of the outer ring member is equal to a diameter of the first rolling member when the first rolling member rolls on the flat surface of the convex portion during assembly of the rolling bearing unit.

* * * * *